United States Patent [19]

Hiroki et al.

[11] Patent Number: 5,595,702
[45] Date of Patent: Jan. 21, 1997

[54] METHOD OF AND APPARATUS FOR MOLDING SYNTHETIC RESIN SCREWS

[75] Inventors: Toyohisa Hiroki, Chiba-ken; Tadashi Suzuki, Saitama-ken, both of Japan

[73] Assignees: Toska Co., Ltd., Tokyo; Optec Co., Ltd., Saitama-ken, both of Japan

[21] Appl. No.: 256,362

[22] PCT Filed: Dec. 24, 1993

[86] PCT No.: PCT/JP93/01877

§ 371 Date: Jul. 20, 1994

§ 102(e) Date: Jul. 20, 1994

[87] PCT Pub. No.: WO94/14593

PCT Pub. Date: Jul. 7, 1994

[30] Foreign Application Priority Data

Dec. 25, 1992 [JP] Japan .................................. 4-347167

[51] Int. Cl.$^6$ ................................................. B29C 45/33
[52] U.S. Cl. ................ 264/318; 264/328.1; 264/334; 249/59; 425/330; 425/542; 425/DIG. 58
[58] Field of Search ..................... 264/328.1, 318, 264/334; 249/59, 63, 64; 425/542, 556, 577, 330, DIG. 58

[56] References Cited

U.S. PATENT DOCUMENTS

| | | | |
|---|---|---|---|
| 1,304,571 | 5/1919 | Kirk et al. | 249/59 |
| 1,349,122 | 8/1920 | Edlund | 425/DIG. 58 |
| 2,949,636 | 8/1960 | Mastin | 425/DIG. 58 |
| 3,595,301 | 7/1971 | Bauer | 425/DIG. 58 |
| 4,284,124 | 8/1981 | Komatsu et al. | 425/330 |
| 4,588,158 | 5/1986 | Mehra | 425/577 |
| 4,633,932 | 1/1987 | Ferguson | 249/59 |
| 4,998,706 | 3/1991 | Hyll | 425/DIG. 58 |
| 5,114,657 | 5/1992 | Miyajima | 425/577 |

FOREIGN PATENT DOCUMENTS

| | | | |
|---|---|---|---|
| 161787 | 10/1985 | European Pat. Off. | 264/318 |
| 57-178715 | 11/1982 | Japan | 264/318 |
| 60-32609 | 2/1985 | Japan | 425/330 |
| 63-25028 | 2/1988 | Japan | 425/330 |
| 2-208013 | 8/1990 | Japan . | |

*Primary Examiner*—Jill L. Heitbrink
*Attorney, Agent, or Firm*—Nikaido, Marmelstein, Murray & Oram LLP

[57] ABSTRACT

An apparatus for molding a synthetic resin screw includes upper mold members 2 and 4, lower mold members 3 and 5, and four sets of slide cores 2a, 4a, 3a and 5a supported by the respective mold members and withdrawable in directions parallel to a parting plane between the upper mold members and the lower mold members.

12 Claims, 7 Drawing Sheets

METHOD OF AND APPARATUS FOR MOLDING SYNTHETIC RESIN SCREWS

TECHNICAL FIELD

The present invention relates to a method of molding screws of a synthetic resin and a molding apparatus for carrying out the method.

BACKGROUND ART

Screws made of a synthetic resin are not only remarkably light in weight in comparison with screws made of a metal and can be mass-produced, but also their production cost is relatively low because their material is relatively inexpensive. In addition, they can be easily produced with different pitches and/or different thread shapes in section. Therefore, they have been increasingly widely utilized as being incorporated in various feeding devices.

For example, paper sorters operatively associated with copying machines are required to incorporate such a mechanism that can move a number of vertically disposed sorter trays successively to their prescribed positions so as to bring them to be in spaced arrangement or to be collected at a bottom position, or can broaden the spacing between adjacent sorter trays on the side of the copying machine at which copied papers are discharged than on the other side, and synthetic resin-made screws are utilized in this mechanism. Synthetic resin-made screws are also used in various devices, such as the zoom mechanisms of cameras or the head transporting mechanisms of printers.

If upper and lower molding blocks are used to mold such a synthetic resin screw by means of a cavity the center axis of which lies in a parting plane formed between the upper and lower molding blocks, it will be difficult to withdraw a molded screw longer than one pitch from a mold assembly. Specifically, if the molded screw is observed from one side thereof along its horizontal axis, by noting either one of the side faces (flights) of a particular thread, it can be seen that a top half which corresponds to an angular extent of 90° (a ¼ pitch of the thread) above the center line is visibly exposed, i.e., the top half is in the "non-undercut state" in which the molded product can be withdrawn from the mold assembly in the direction of the eyes of the viewer. Further, it will be seen that a bottom half which follows the top half and corresponded to an angular extent of 90° below the center line is not visibly exposed, i.e., the bottom half is in the "undercut state" in which no molded product can be withdrawn from the mold assembly.

Further, another top-half side face which is opposite to the non-undercut side face of the thread above the center line is in the undercut state. By noting the opposite side faces of two adjacent threads formed on the opposite sides of a particular root, it will be seen that one of the side faces is in the non-undercut state, whereas the other side face is in the undercut state.

As will be understood from the above description, in each one-pitch portion of a screw thread, a so-called undercut portion which hinders a molded product from being withdrawn from a mold assembly is formed every 90° along either side face of the screw thread. In addition, if either side face is in the non-undercut state, the opposite side face is in the undercut state.

The shape of the screw thread is formed as a twisted plane in the above-described manner. A molded screw having thin threads made of a soft molding material, such as polyethylene resin, can forcedly be released from a mold assembly, but a molded product made of a resin suitable for use as a structure material, such as nylon, cannot be withdrawn from the mold assembly because an undercut portion of the molded product will be caught in the cavity of the mold assembly. Accordingly, it is substantially difficult to carry out molding with a mold assembly having a simple structure made up of a small number of movable members.

Another problem is involved in the cross-sectional shape of a screw thread, such as a square thread or a wedge thread. For example, if a square-threaded screw is molded, the thread is formed in such a manner that each side face of the thread erects at right angles to the adjacent root, so that a major part of the screw thread is formed in the undercut state and it is difficult to withdraw the molded screw from the mold assembly.

Since a withdrawing slope is needed to cope with this problem, it has been necessary to employ a screw with a wedge thread having considerably inclined side faces. If a square-threaded screw having side faces formed at right angles to the root is used in a feeding mechanism, it is possible to realize the function of accurately feeding a feeding member meshed with the square-threaded screw. However, if the side faces of the screw are inclined in the above-noted manner so that the molded screw can easily be withdrawn from the mold assembly, the distance over which a member to be fed is transported becomes inaccurate, accordingly.

For this reason, when a square-threaded screw made of a synthetic resin is to be manufactured, it is necessary to mold a screw having a thread with a trapezoidal cross-section with greatly inclined withdrawing slopes and thereafter form the molded screw into a square-threaded screw by machining. Such a synthetic resin-made square-threaded screw subjected to molding followed by machining can realize a good feeding precision, but it has been impossible to avoid the problem that manufacturing cost becomes higher.

If a synthetic resin-made screw is to be molded by the prior art, because of the technical problem that it is difficult to withdraw a screw from a mold assembly after the screw has been molded, the screw is molded in the state of being cut into "screw units" each having a length corresponding to one pitch with its screw axis positioned in a direction perpendicular to a joining plane of the mold assembly. Then, a projection and a recess are provided in the central portion of each of the screw units so that the projection of each of the screw units can be fitted into the recess of the next one in a socket-and-spigot relationship. Further, to prevent a positional deviation of the screw units, a projection which serves as a stopper and a recess into which to fit the projection are provided in the central portion of each of the screw units.

Incidentally, the "joining plane" of the mold assembly represents the plane in which a plurality of molding blocks join together. When the molding blocks are to move away from each other after the completion of molding, the joining plane serves as a parting plane and appears as a parting line on a molded product. These parting plane and line are hereinafter referred to as "parting plane".

When the thus-molded screw units are to be combined to form a screw of predetermined length, a metal rod is inserted through the holes formed in the central portions of the respective screw units, and to impart strength to the screw, the projection formed on the contact face of each of the screw units is fitted into the recess formed in the contact face of the adjacent one.

However, the synthetic resin screw constructed of the screw units connected in this manner has the problem that since the screw units are separate components each of which corresponds to one pitch of the screw thread, steps are easily formed at the joint faces between the respective connected screw units. If a screw having the steps is employed, no smooth feeding is effected and noise easily occurs. In addition, accurate and stable feeding cannot be effected.

Since the conventional, synthetic resin screw is formed by connecting a multiplicity of screw units in series, dimensional errors are accumulated and amount to a considerably large error with respect to the entire length of the screw. Further, since the screw units each of which corresponds to one pitch are connected by fitting along the axis, the obtained screw is low in mechanical strength and can be utilized in a feeding device for a supporting plate of a sorter of a copying machine at the best.

Although the zoom mechanism of a camera lens or the head transporting mechanism of a printer requires precision screws, it is necessary to employ screws each of which is produced by machining.

DISCLOSURE OF INVENTION

The present invention is intended to provide a method of molding a high-precision synthetic resin screw without using a multiplicity of screw units, as well as a molding apparatus for optimally carrying out the method, both of which can solve the problems involved in the conventional method of and apparatus for molding a synthetic resin screw.

To achieve the above object, in accordance with one aspect of the present invention, there is provided a method of molding a synthetic resin screw, which comprises the steps of: dividing a thread for one pitch into at least four equal portions about the center axis of a screw; forming mold-element parting planes at the respective crest and root of the thread to form a cavity portion for the thread for one pitch by means of at least six mold elements; injecting a molten resin into the thus-formed cavity to mold a synthetic resin screw; withdrawing mold elements placed in a non-undercut state while fixing the mold elements fixed placed in an undercut state; and withdrawing the mold elements placed in the undercut state in a direction in which they are placed in the non-undercut state.

The method according to the present invention is also characterized in that when a screw is to be withdrawn from a mold assembly after molding, slide cores supported by molding blocks are first moved and the molding blocks are then opened.

In accordance with another aspect of the present invention, there is provided an apparatus for molding a synthetic resin screw which comprises at least six mold elements including two molding blocks separable from each other about a parting plane (main mold elements: an upper molding block and a lower molding block) and four slide cores (auxiliary mold elements) supported by the molding blocks, two slide cores for each of the molding blocks, the four slide cores being respectively withdrawable in directions perpendicular to the parting plane formed between the molding blocks. A cavity is formed to extend in the plane in which the respective mold elements are assembled, and the mold elements are disposed in an area corresponding to a thread for one pitch, the area being divided into at least four equal portions about the center axis of the screw. The parting planes between some of the mold elements are formed at the crest and the root of each thread, and, in the aforesaid area corresponding to a thread for one pitch, a cavity portion is formed by at least eight mold elements (a mold portion for defining the shape of a thread).

The aforesaid mold assembly includes the upper molding block and the lower molding block (main mold elements) which are separable from each other vertically or horizontally, and four sets of slide cores (auxiliary mold elements) which constitute part of the cavity formed by these molding blocks, two sets for each of the molding blocks. In this case, the mold assembly includes the upper and lower molding blocks as well as the four sets of slide cores, i.e., at least six mold elements. However, if the mold assembly according to the present invention is constituted of the upper and lower molding blocks, a remarkably complicated process is needed to form the shape of a cavity area of each of the upper and lower molding blocks. To avoid this problem, each of the upper and lower molding blocks is prepared as two separate mold elements, which are integrally operative in a molding apparatus.

Specifically, the periphery of a screw to be molded is divided into four areas each having an angular extent of 90° about the center axis of the screw, and the cavity is formed by each of the molding blocks and the slide cores in such a manner that parting lines are respectively formed on a screw thread Y and a root T so that a face which contacts a resin may not form an undercut.

The basic technical concept of the present invention is to divide the periphery of a screw to be molded into four areas having equal angular extents about the center axis of the screw and selectively dispose mold elements in each of the areas. The present invention is also characterized in that a portion of the upper or lower molding block and a slide core which accompanies the upper or lower molding block are disposed in pair between adjacent threads. However, if required, it is also possible to divide the periphery into a greater number of areas.

A thread for one pitch is molded by a total of six mold elements, which include two mold elements (i.e., upper and lower molding blocks) as well as a total of four sets of slide cores, two sets of slide cores being provided on each of the upper and lower molding blocks, (if each of the upper and lower molding blocks is prepared as two separate molding members for the convenience of manufacture, a total of eight mold elements are employed). Accordingly, no undercut occurs at any location in the cavity formed by the upper and lower molding blocks and the four sets of slide cores.

Thus, a screw-shaped cavity is formed with the upper and lower molding blocks and the respective slide cores provided thereon being assembled, and a molten synthetic resin is injected into the cavity.

If the respective slide cores provided on the upper and lower molding blocks are moved with the upper and lower molding blocks being held in a mold closing state, the slide cores are removed from the molded, synthetic resin screw. In this state, the synthetic resin screw is supported by the upper and lower molding blocks.

Since the synthetic resin screw is held by the upper and lower molding blocks in the above-described manner, the upper and lower molding blocks are relatively opened to release the synthetic resin screw from all the mold elements, so that the molded, synthetic resin screw can be taken out. Although the terms "upper molding block" and "lower molding block, are herein employed for the convenience of explanation, it is apparent that the molding blocks may also be horizontally disposed.

BEST MODE FOR CARRYING OUT THE INVENTION

A method of and an apparatus for molding a synthetic resin screw will be described below with reference to the accompanying drawings.

Figure 1:
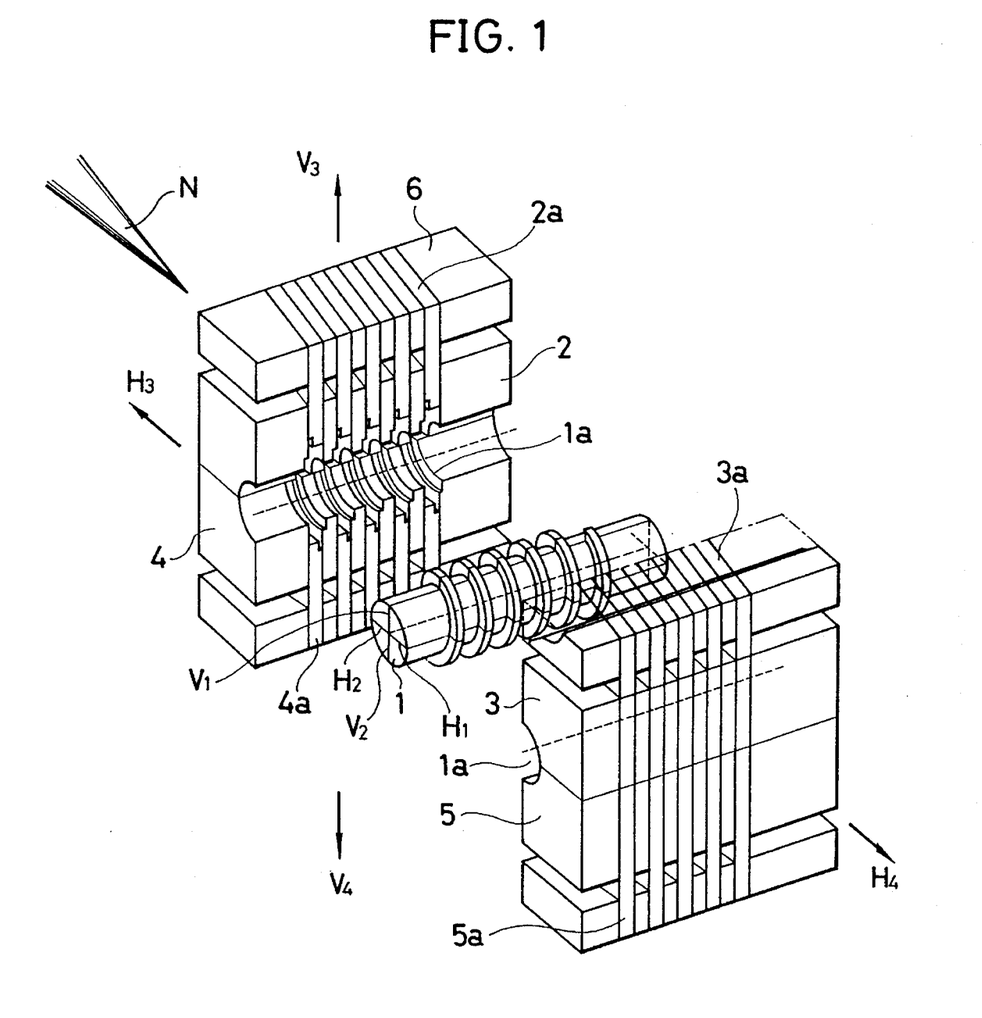
FIG. 1 is a diagrammatic, perspective view showing a state in which a synthetic resin screw is disposed in a middle position between upper and lower molding blocks which are shown as being horizontally disposed, for the convenience of the making of the drawing.

FIG. 1 shows a case where a synthetic resin screw 1 is horizontally molded. In FIG. 1, for the convenience of the making of the figure, an upper molding block and a lower molding block are shown as being respectively disposed on the left- and right-hand sides of the screw 1, and slide cores which are supported by each of the upper and lower molding blocks are shown as being retracted from a screw thread.

The upper and lower molding blocks are opposed to each other, and include a plurality of mold members which are respectively located in a plurality of areas separated from each other by horizontal lines $H_1$ and $H_2$ and vertical lines $V_1$ and $V_2$. When the upper and lower molding blocks are assembled in position, a predetermined cavity 1a is formed. Incidentally, in an actual molding apparatus, the molding blocks may be arranged horizontally or vertically.

The upper molding block is made up of a first upper mold member 2, one set of first slide Cores 2a which constitute part of the first upper mold member 2, a second upper mold member 4 which is paired with the first upper mold member 2, and one set of second slide cores 4a which constitute part of the second upper mold member 4. Similarly, the lower molding block, which is paired with the upper molding block, is made up of a first lower mold member 3, a second lower mold member 5, one set of third slide cores 3a and one set of fourth slide cores 5a.

In the shown example, for the convenience of production, after the slide cores 2a, 4a, 3a and 5a have individually been produced, the respective sets of the slide cores 2a, 4a, 3a and 5a are integrally fixed to corresponding supporting blocks 6. However, it is also possible to integrally produce the slide cores 2a, 4a, 3a and 5a and the respective supporting blocks 6. Although each of the upper and lower molding blocks is assembled from two separate portions, it is also possible to integrally produce each of the upper and lower molding blocks if such a production is allowed.

Each of the eight mold elements 2, 2a, 4, 4a, 3, 3a and 5 and 5a has a cut-out portion formed in a corner at which its joining faces meet, so as to form the cavity 1a in which to mold the screw 1.

The one set of first slide cores 2a is assembled for movement toward and away from the center axis of the cavity 1a with respect to the first upper mold member 2, and these first slide cores 2a are integrally supported by the corresponding supporting block 6. The second slide cores 4a which are disposed on a side opposite to the first slide cores 2a are also integrally supported by the corresponding supporting block 6, and is arranged to be movable toward and away from not only the center axis of the cavity 1a but also the first slide cores 2a.

As will be described later, as shown in for example FIG. 1, the first and second upper mold members 2 and 4 as well as the respective sets of first and second slide cores 2a and 4a engaged therewith are arranged to be integrally movable back and forth along an $H_3$-direction with respect to the sheet surface of FIG. 1. Further, the respective sets of first and second slide cores 2a and 4a are arranged to be movable in either $V_3$- or $V_4$-direction perpendicular to the $H_3$-direction.

Incidentally, normally, the first and second upper mold members 2 and 4 as well as the first and second slide cores 2a and 4a are integrally fixed to a molding machine. The reason why the upper and lower molding blocks are each formed by two separate portions, the upper mold members 2 and 4 and the lower mold members 3 and 5 respectively, is that it is necessary to facilitate formation of the cavity 1a since, as will be described later, the molding blocks according to the present invention are so complex that no cavity can easily be formed. However, under the condition that this cavity can easily be formed, it is also possible to integrally produce the first and second upper mold members 2 and 4 as well as the first and second lower mold members 3 and 5, respectively.

The lower molding block is made up of the first lower mold member 3, the second lower mold member 5, the third slide cores 3a and the fourth slide cores 5a. The first and second upper mold members 2 and 4 are fixed to a fixed supporting base of the molding apparatus, while the first and second lower mold members 3 and 5 are supported on a movable supporting base of the molding apparatus, so that the lower mold members 3 and 5 are movable with respect to the upper mold members 2 and 4.

In a mold assembly for molding the synthetic resin screw 1, which is adopted for carrying out the present intention, the first upper mold member 2 and the second upper mold member 4 as well as the first slide cores 2a and the second slide cores 4a which are respectively supported by the upper mold members 2 and 4 constitute the upper molding block (or left and right molding blocks). Incidentally, the symbol N shown in FIG. 1 denotes a nozzle for injecting a molten synthetic resin, and is disposed in the central portion of the upper molding block.

The first lower mold member 3 and the second lower mold member 5 as well as the third slide cores 3a and the fourth slide cores 5a constitute the lower molding block (or right and left molding blocks), which is mounted on the movable supporting base.

The motion of each of the mold members 2, 4, 3 and 5 during the formation of the synthetic resin screw 1 will be described below in brief.

Referring to FIG. 1, when the upper mold members 2 and 4 and the slide cores 2a and 4a engaged with the respective upper mold members 2 and 4 as well as the lower mold members and 5 and the slide cores 3a and 5a engaged with the respective lower mold members 3 and 5 are assembled around the center axis, parting planes are formed to intersect in the form of a cross. When the cavity 1a for the screw 1 is formed to extend along the center axis, a molten resin is injected from the central portion of the upper molding block into the cavity 1a through the nozzle N. After the injected resin has solidified, the slide cores 2a and 3a and the slide cores 4a and 5a are withdrawn in the $V_3$- and $V_4$-directions, respectively. In this state, the synthetic resin screw 1 is supported between the upper mold block and the lower molding block.

Then, if the lower molding members 3 and 5 are made to move in the $H_4$-direction with the upper molding members 2 and 4 fixed, the screw 1 molded in the interior of the mold assembly can be taken out of the opened mold. Although not shown, it is a matter of course to use a knockout pin or the like in taking the screw 1 out of the opened mold.

Figure 2:
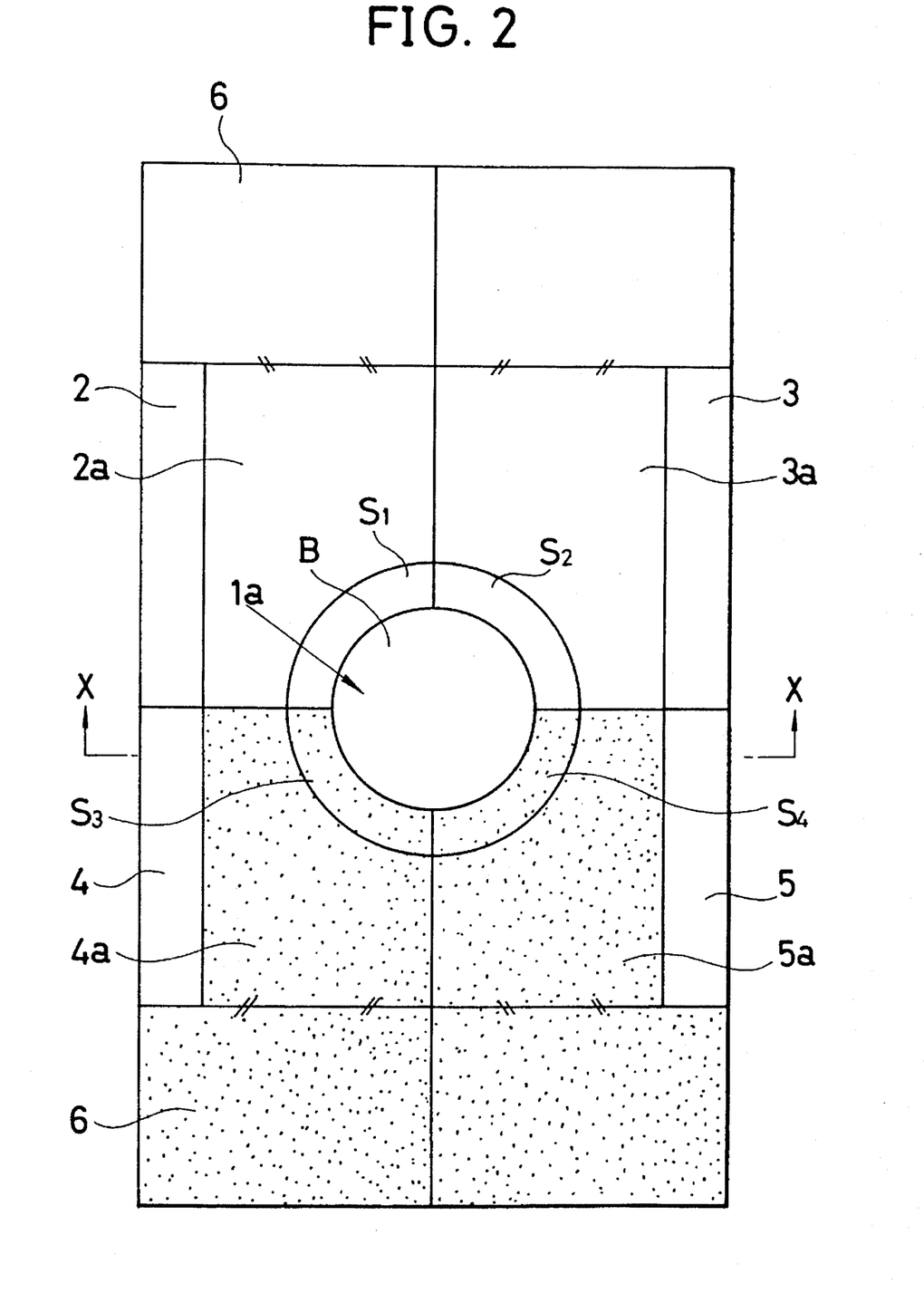
FIG. 2 is an explanatory view showing the relationship between the synthetic resin screw and mold elements, i.e., the upper molding block, the lower molding block and slide cores respectively combined with the upper and lower molding blocks.

FIG. 2 shows the state in which the eight mold elements, i.e., the upper mold members 2 and 4 and the slide cores 2a and 4a as well as the lower mold members 3 and 5 and the slide cores 3a and 5a, are assembled around the center axis to form the cavity 1a. Incidentally, the slide cores 2a, 4a, 3a and 5a are respectively fixed to the supporting blocks 6 in such a manner that each of the slide cores 2a, 4a, 3a and 5a can move integrally with a respective one of the supporting blocks 6.

A thread which forms part of the screw 1 is molded in four sets of cavities $S_1$, $S_2$, $S_3$ and $S_4$ which are disposed around a cylindrical hollow B formed by the mold members 2, 4, 3 and 5 along the center axis.

Figure 3:
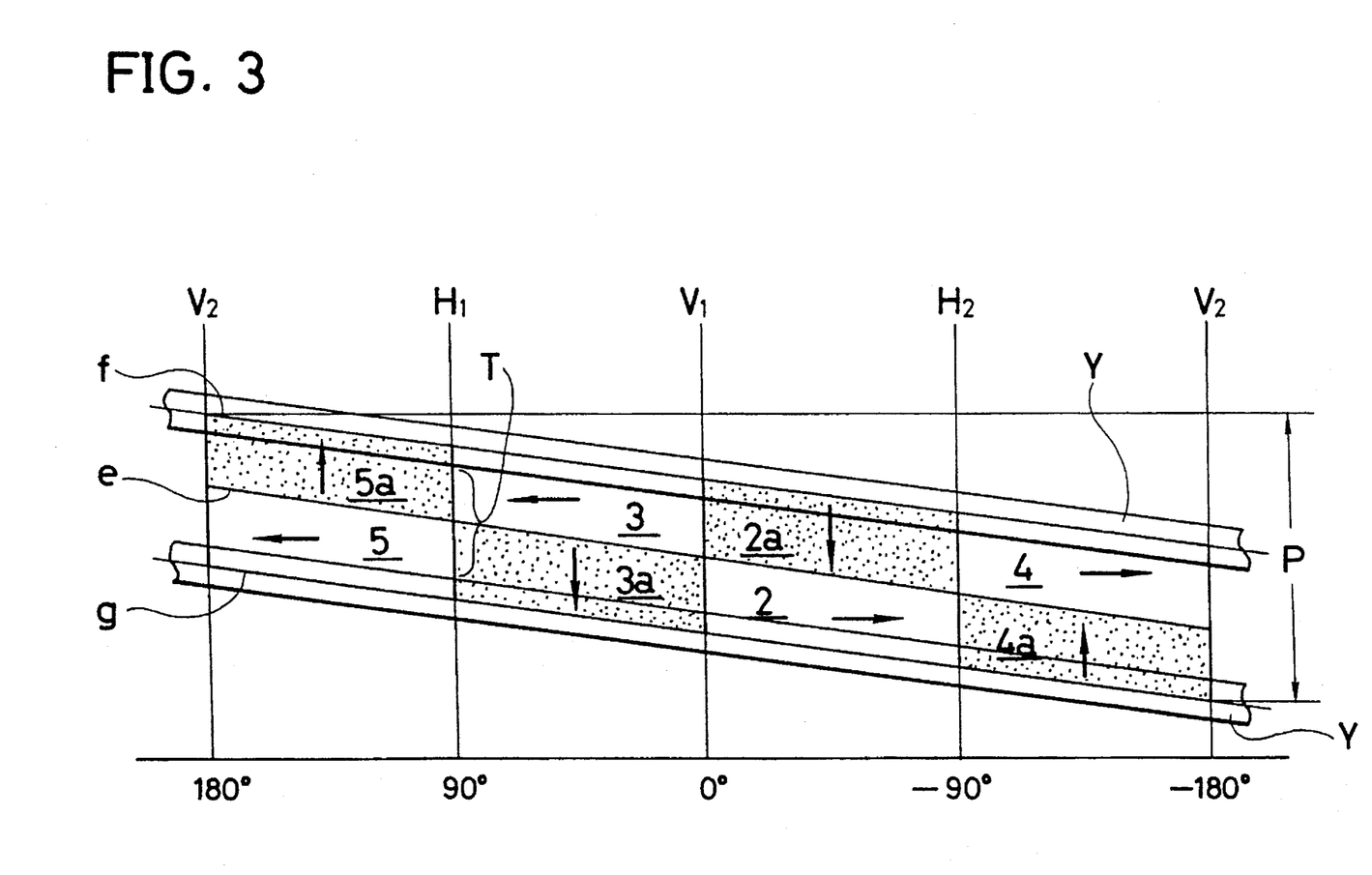
FIG. 3 is a developed view showing a state in which the upper and lower molding blocks and the respective slide cores are disposed within one pitch of a screw thread.

FIG. 3 shows in developed form a portion of the screw 1 which corresponds to one pitch P, and the part is developed about the vertical axis $V_1$, i.e., 0°, to the right- and left-hand sides by 180° each. The right- and left-hand sides of the developed part respectively include two areas each having an angular extent of 90° as shown at −90° and −180° and at 90° and 180°. The vertical lines shown in FIG. 3 respectively represent the vertical lines $V_1$, $V_2$ and the horizontal lines $H_1$, $H_2$.

In FIG. 3, individual arrows indicate the directions in which the respective mold elements, which form the cavity 1a, move with respect to the vertical axis $V_1$, i.e., 0° . The downward arrows indicate mold elements which move in the direction of the obverse side of the sheet, while the upward arrows indicate mold elements which move in the direction of the reverse side of the sheet. The rightward arrows indicate mold elements which move toward the right, while the leftward arrows indicate mold elements which move toward the left.

The following features will be understood from FIG. 3.

A) The aforesaid eight mold elements are disposed for forming a thread for one pitch.

B) The upper mold members 2, 4 and the lower mold members 3, 5 are respectively paired with the slide cores 2a, 4a and 3a, 5a in the form of 2–2a, 4–4a, 3–3a and 5–5a.

C) Adjoining metal elements are arranged to move in directions which differ from each other by 90°.

D) The upper mold members 2 and 4 are out of phase with each other, whereas the lower mold members 3 and 5 are out of phase with each other.

For example, when the upper mold member 2 forms either side face of a thread over an angular extent of 90°, the upper mold member 4 forms the other side face of the thread over the next angular extent of 90°.

For this reason, if the upper mold members 2 and 4 and the lower mold members 3 and 5 are to be respectively integrally formed, these mold members 2, 4, 3 and 5 are disposed in such a manner that each of them is out of phase with the adjacent one by ¼ of a thread for one pitch.

Figure 4:
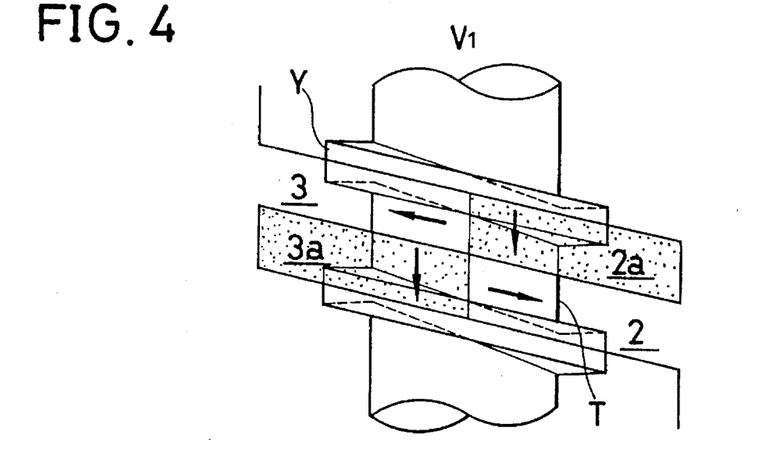
FIG. 4 is a view showing the arrangement of the mold elements positioned at a location $V_1$ of FIG. 3.

FIG. 4 shows the arrangement in an area taken along the vertical axis $V_1$ of the first upper mold member 2 and the first lower mold member 3 as well as the first slide core 2a and the third slide core 3a which are respectively engaged therewith (i.e., the arrangement of these mold elements as viewed along the periphery of the screw 1).

As can be understood from FIG. 4, since no undercuts are formed on this side as viewed in FIG. 4 in the respective areas occupied by the slide core 3a and the slide core 2a, the slide core 3a and the slide core 2a can be withdrawn toward this side (as indicated by the corresponding downward arrows). However, since undercut portions are produced in the side faces of a thread Y in the respective areas occupied by the upper mold member 2 and the lower mold member 3, the upper mold member 2 and the lower mold member 3 are placed in the state of holding the screw 1.

Figure 7:
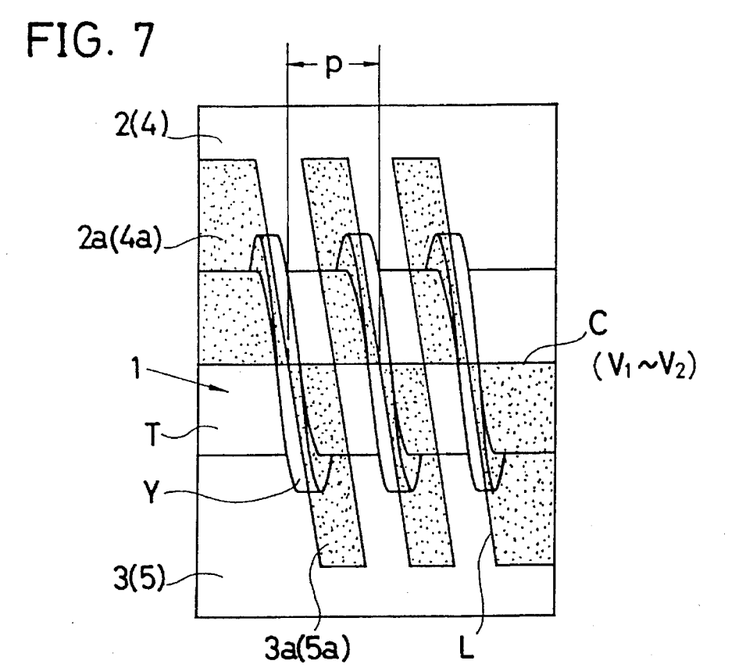
FIG. 7 is an explanatory view showing the relationship between the upper molding block, the lower molding block and the slide cores which accompany the respective molding blocks.
Figure 8:
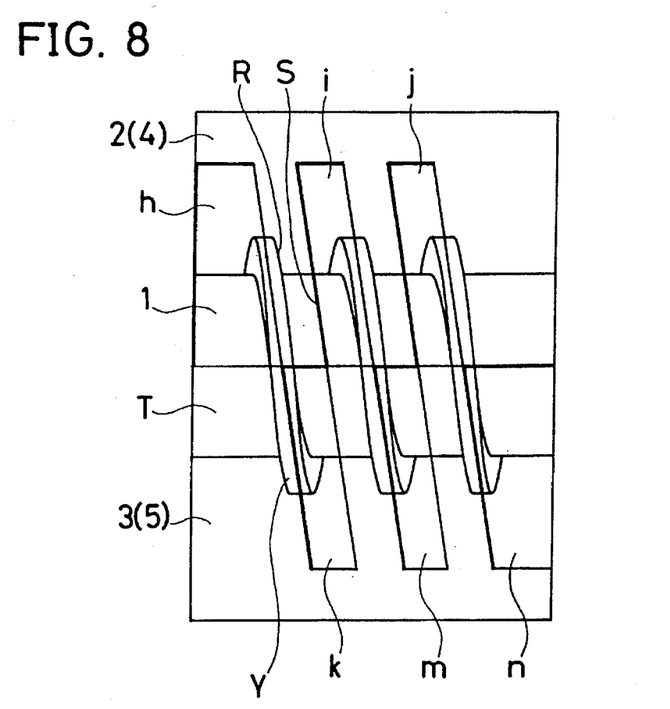
FIG. 8 is an explanatory view showing a state in which the respective slide cores are withdrawn from the upper and lower molding blocks and the synthetic resin screw is disposed therebetween.

When the slide cores 2a and 3a are withdrawn from the other mold elements, cavities are formed along the respective side faces of the upper mold member 2 and the lower mold member 3 (refer to FIGS. 7 and 8). Accordingly, the upper mold member 2 and the lower mold member 3 can respectively move from the vertical axis $V_1$ toward the right and the left as viewed in FIG. 3.

Figure 5:
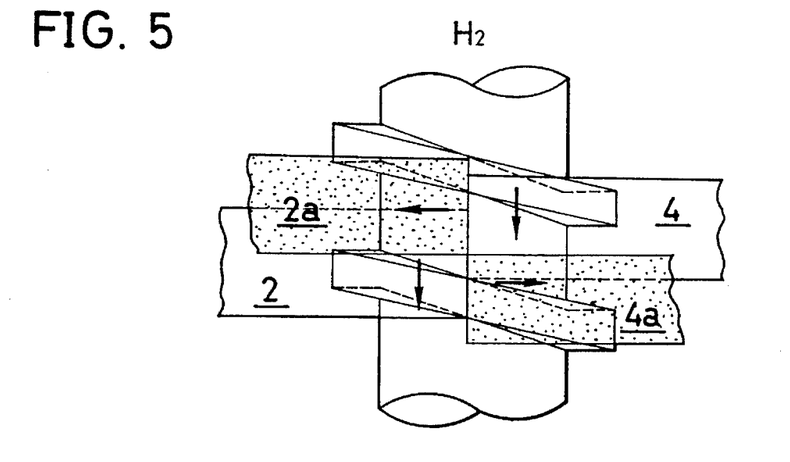
FIG. 5 is a view showing the arrangement of the mold elements positioned at a location $H_2$ of FIG. 3.
Figure 6:
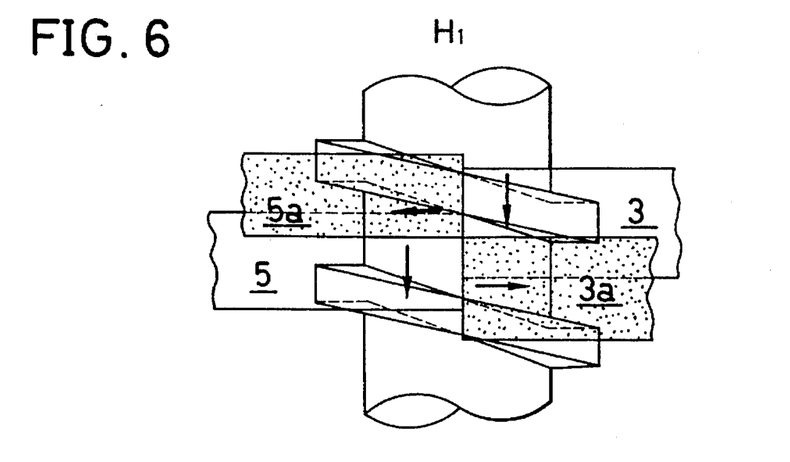
FIG. 6 is a view showing the arrangement of the mold elements positioned at a location $H_1$ of FIG. 3.

FIG. 5 shows the state of arrangement of the mold elements 2, 2a and 4, 4a along the horizontal axis $H_2$. FIG. 6 shows the state of arrangement of the mold elements 5, 5a and 3, 3a along the horizontal axis $H_1$.

As indicated by the corresponding arrows in FIG. 5, since there are no undercuts in the areas occupied by the upper mold members 2 and 4, the upper mold members 2 and 4 can move toward this side as viewed in FIG. 5, whereas the slide cores 4a and 2a can move toward the right and the left, respectively.

In FIG. 3, a line "e" represents a parting plane which is formed on a root T of the screw 1, and lines "f" and represent parting planes which are respectively formed on the crests of adjacent threads of a screw thread Y. As shown, the parting planes are respectively formed on the root T of the screw 1 and the crests of the adjacent threads of the screw thread Y, and alternately selected upper and lower mold members and alternately selected upper and lower slide cores are arrayed in alternate order along one side face of each thread of the screw thread Y. Also, any one of the mold members and the corresponding one of the slide cores are disposed in pair in each of the four areas between the two adjacent threads of the screw thread Y.

In other words, the eight mold elements are disposed in the respective areas formed by the vertical axis $V_1$, the horizontal axis $H_2$, the vertical axis $V_2$, the horizontal axis $H_1$ and the vertical axis $V_2$ as well as the parting planes "e", "f" and "g". Specifically, the eight mold elements are disposed for forming a thread for one pitch (if each of the upper and lower molding blocks is prepared as an integral molding block, a total of six mold elements are disposed).

As shown in FIG. 3, the first upper mold member 2 and the first slide core 2a are disposed on the right-hand side of the vertical axis $V_1$, whereas the first lower mold member 3 and the third slide core 3a are disposed on the left-hand side of the vertical axis $V_1$. When the slide cores 2a and 3a are withdrawn toward this side as indicated by the corresponding arrows (in the $V_3$-direction in FIG. 1), the upper mold member 2 and the lower mold member 3 respectively move toward the right (in the $H_3$-direction in FIG. 1) and toward the left (in the $H_4$-direction in FIG. 1). Thus, the mold members 2 and 3 and the slide cores 2a and 3a are withdrawn from the angular extent of 180° defined between the horizontal axis $H_1$ and the horizontal axis $H_2$, and the corresponding portion of the molded screw 1 is removed from the mold.

FIG. 7 is a side elevational view of the mold elements shown in FIG. 2, and shows the relationship between the cavity 1a for the screw 1, the mold members 2 (4) and 3 (5) and the slide cores 2a (4a) and 3a (5a). The screw thread Y is spirally formed around a root-diameter portion which is defined by the root T of the screw 1. The element which is shown as a white portion adjoining the right-hand face of the screw thread Y represents the first upper mold member 2 (or the second upper mold member 4), while the element which is shown as a white portion adjoining the left-hand face of the screw thread Y represents the first lower mold member 3 (or the second lower mold member 5). The upper dotted portions represent the first slide cores 2a (or the second slide cores 4a), while the lower dotted portions represent the third slide cores 3a and the fourth slide cores 5a.

Although not shown in FIG. 7, the upper mold members 2 and 4, the lower mold members 3 and 5, the slide cores 2a and 4a and the slide cores 3a and 5a are respectively out of phase with each other, as can be seen from FIG. 3. In FIG. 7, mold elements which are not shown are denoted by parenthesized reference numerals.

As can be understood from FIG. 7, the eight mold elements are separated into two upper and lower groups along the center line C of the screw 1, and the upper group includes the upper mold members 2 and 4 and the first slide cores 2a and the second slide cores 4a, while the lower group includes the lower mold members 3 and. 5 and the third slide cores 3a and the fourth slide cores 5a. Parting lines L are respectively formed on the crests of the adjacent threads of the screw thread Y and the root T (refer to the lines denoted by symbols "e", "f" and "g" in FIG. 3). In other words, six or eight mold elements are made to assemble for molding a thread of the screw 1 for one pitch, whereby the cavity 1a is formed.

As described above with reference to FIGS. 3 through 7, the mold according to the present invention is characterized in that the parting lines L ("e", "f" and "g") are respectively formed on the crests of the adjacent threads of the screw thread Y and the root T of the screw 1 which is molded in the cavity 1a formed by the mold elements at the center thereof.

Referring to FIG. 7, the side faces (flights) of the screw thread Y which adjoin the respective slide cores 2a and 3a (or the respective slide cores 4a and 5a) are non-undercut as viewed from the direction in which the slide cores 2a and 3a are to be withdrawn. This indicates that the slide cores 2a and 3a can be withdrawn in the same direction (toward the obverse side of the sheet of FIG. 7, while the slides 4a and 5a can be withdrawn toward the reverse side of the sheet of FIG. 7.

Figure 9:
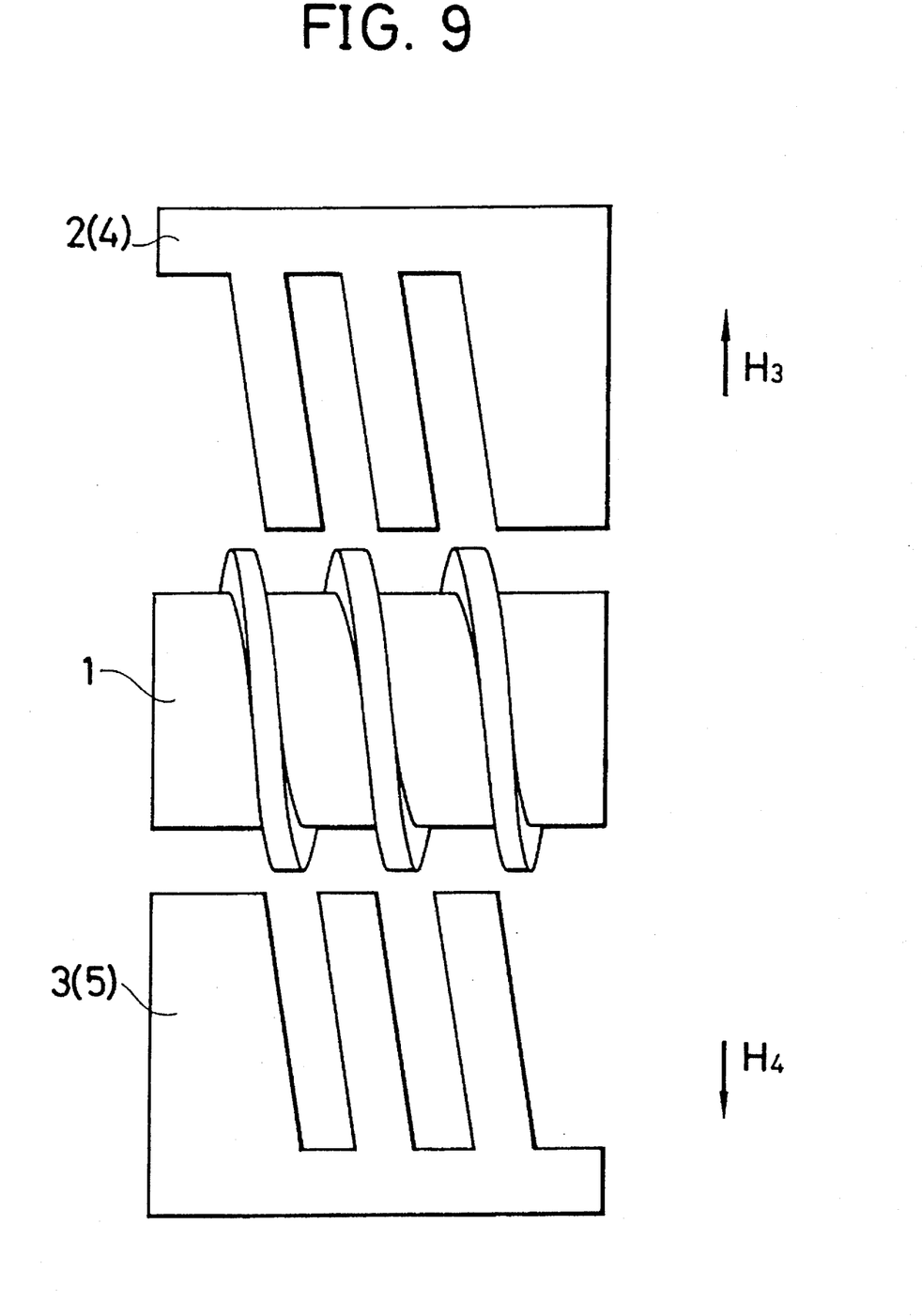
FIG. 9 is an explanatory view of a state in which the synthetic resin screw can be withdrawn with the upper and lower molding blocks moved away from each other.

When the slide cores 2a, 3a, 4a and 5a are withdrawn, cavities "h", "i", "j", "k", "m" and "n" are formed as shown in FIG. 8 so that, by utilizing the corresponding cavities, the upper mold members 2, 4 and the lower mold members 3, 5 can respectively move in the upward and downward directions as viewed in FIG. 9 without being hindered by the undercuts.

Specifically, an undercut portion and a non-undercut portion occur with respect to any of the upper mold members 2 and 4, the slide cores 2a and 4a which accompany the respective upper mold members 2 and 4, the lower mold members 3 and 5, and the slide cores 3a and 5a which accompany the respective lower mold members 3 and 5. Incidentally, it is apparent that this state can be similarly obtained over the entire screw 1 in any portion thereof as viewed in the rotational direction thereof.

In other words, the molded screw 1 can be taken out of the mold assembly in such a way that the respective slide cores are withdrawn from the non-undercut portions and the resultant cavities are utilized to cause the mold members which are in the state of gripping the screw 1 to move in directions each of which 90° differs from the direction of withdrawal of the corresponding one of the slide cores (refer to FIG. 3).

FIG. 8 shows the state in which the slide cores 2a, 4a and the slide cores 3a, 5a which respectively accompany the upper mold members 2, 4 and the lower mold members 3, 5 are withdrawn with the screw 1 clamped between the upper mold members 2, 4 and the lower mold members 3, 5.

Referring to FIG. 8, a portion R serves to mold part of the screw thread Y in each of the cavities "h", "i" and "j" formed on the side of the upper mold member 2 (4) by causing the slide cores 2a(4a) to move in their withdrawal directions after the completion of molding of the screw 1. As viewed from the top of the sheet of FIG. 8, the portion R is positioned in a non-undercut portion. A portion which serves to mold part of the root T forms the parting plane of the upper mold member 2 (4).

Each of the cavities "k", "m" and "n" formed on the side of the lower mold member 3 (5) forms a non-undercut portion and an undercut portion at positions 90° offset from the respective positions of a non-undercut portion and an undercut portion which are formed by the corresponding one of the aforesaid cavities "h", "i" and "j". That is to say, the respective slide cores 2a(4a) and 3a (5a) which are engaged with the upper mold member 2 (4) and lower mold member 3 (5) can be withdrawn in planes perpendicular to the sheet surface of FIG. 8. Then, if these slide cores 2a(4a) and 3a (5a) are withdrawn and the cavities "h", "i", "j", "k", "m" and "n" are formed, the upper mold member 2 (4) and the lower mold member 3 (5) can be made to move in directions perpendicular to the respective slide cores 2a (4a) and 3a (5a), i.e., in the upward and downward directions, respectively, as viewed in FIG. 8.

FIG. 9 shows the manner in which, after the synthetic resin screw 1 is molded and the slide cores 2a, 3a, 4a and 5a are withdrawn, the molded synthetic resin screw 1 is taken out with the upper mold members 2, 4 and the lower mold members 3, 5 being respectively moved by predetermined distances in the upward and downward directions as viewed in FIG. 9 (in the $H_3$- and $H_4$-directions shown in FIG. 1).

Figure 10:
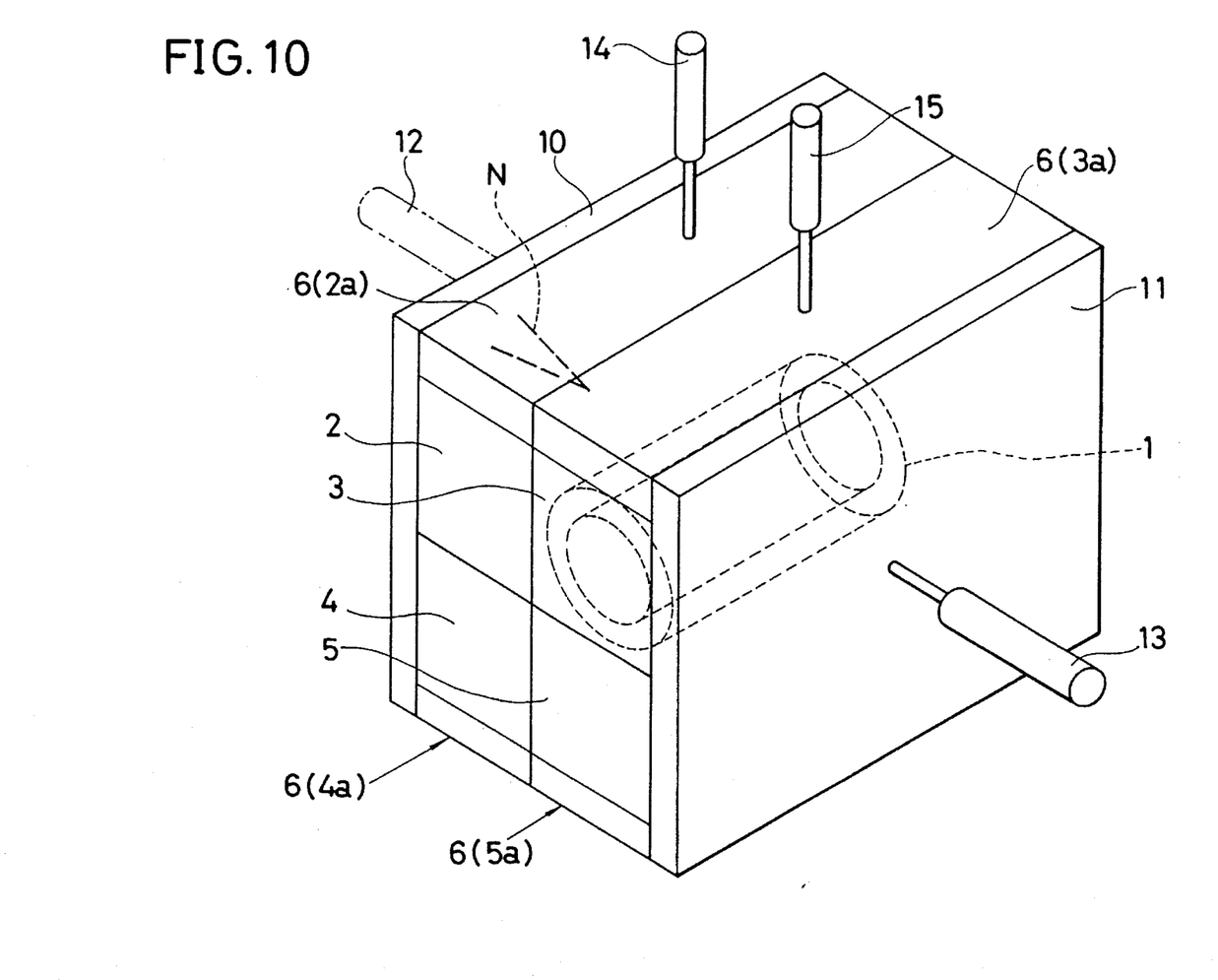
FIG. 10 is a view showing driving means for a mold assembly.

FIG. 10 schematically shows a molding apparatus which is mounted to a molding machine (not shown), and depicts the upper molding block and the lower molding block on the left-and right-hand sides similarly to FIG. 1.

The upper mold members 2 and 4 are fixed to a supporting plate 10, while the lower mold members 3 and 5 are fixed to a supporting plate 11. Although not shown in detail, the slide cores 2a and 4a are movably engaged with the upper mold members 2 and 4, respectively. Similarly, the slide cores 3a and 5a are movably engaged with the lower mold members 3 and 5, respectively.

A cylinder 12 and a cylinder 13 are respectively provided on the supporting base 10 and the supporting plate 11. (In a normal molding machine, since the supporting base 10 is fixed to the molding machine, the cylinder 12 is not needed.) Cylinders 14 (one of which is shown) for driving the slide cores 2a and 4a of the Upper mold members 2 and 4 are respectively provided above and below the molding apparatus as viewed in FIG. 10. Cylinders 15 (one of which is shown) for driving the slide cores 3a and 5a of the upper mold members 3 and 5 are respectively provided above and below the molding apparatus as viewed in FIG. 10.

The upper mold members 2 and 4 are fixed to the molding machine, and a nozzle N for injecting a molten synthetic resin is connected to the center of the upper mold members 2 and 4.

Incidentally, in this embodiment, since the mold assembly has the complex structure shown in FIG. 3, the upper mold members 2 and 4 and the lower mold members 3 and 5 are respectively formed as separate members for the convenience of production of the mold. However, as described previously, it is also possible to produce each of the upper molding block (2 and 4) and the lower molding block (3 and 5) as one molding block if such a production is allowed.

In a case where the upper mold members 2 and 4 and the slide cores 2a and 4a provided on the upper mold members 2 and 4 are supported on the supporting base 10 which is fixed to the molding machine, the lower mold members 3 and 5 fixed to the supporting plate 11 as well as the slide cores 3a and 5a are driven forward and backward by the cylinder 13 to open and close the lower molding block with respect to the upper molding block. Incidentally, in the case where the upper mold members 2 and 4 are fixed to the molding machine as described previously, the cylinder 12 may be omitted.

The present apparatus can be remarkably reduced in size by utilizing a cam mechanism instead of the aforesaid cylinder arrangement for moving the molding members and the respective slide cores engaged therewith. However, since an apparatus using the cam mechanism is complex, the illustration and description thereof is omitted. When the synthetic resin screw 1 is to be molded, the lower mold members 3 and 5 are located at their predetermined positions, and the cylinders 15 are manipulated to move the respective slide cores 3a and 5a, thereby forming one cavity half in the lower molding block.

Simultaneously with, or with a time difference with, the above-described operation, the cylinders 14 are manipulated to move the respective slide cores 2a and 4a to their predetermined positions in the upper mold members 2 and 4, thereby forming the other cavity half in the upper molding block.

Then, the cylinder 13 is manipulated to join the lower molding block to the upper molding block, thereby forming the cavity 1a for the screw 1 in the center of the mold assembly. Incidentally, the sequence of the above-described mold closing manipulation can be arbitrarily determined depending on the type of process.

If the cavity 1a for the screw 1 is formed in the mold assembly in the above-described manner, a molten synthetic resin is injected into the cavity 1a from an injection-molding machine through the nozzle N, and the mold assembly is held for a predetermined time. Thus, the screw 1 is molded.

The sequence of the operation of withdrawing the thus-molded screw 1 from the mold assembly will be described below.

If the injection molding of the molten synthetic resin is completed with the mold elements of FIG. 1 assembled as shown in FIG. 10, the cylinders 14 and 15 are respectively operated to move the slide cores 2a and 4a from the upper mold members 2 and 4 and the slide cores 3a and 5a from the lower mold members 3 and 5. This step is shown in FIGS. 7 and 8. Through the step, the portions in which the respective slide cores have been inserted are changed to the cavities "h", "i", "j", "k", "m" and "n".

Then, by utilizing the cavities "h", "i", "j", "k", "m" and "n", as shown in FIG. 9, the upper mold members 2, 4 and the lower mold members 3, 5 are respectively made to move in the $H_3$- and $H_4$-directions perpendicular to the direction of movement of any of the slide cores 2a, 4a, 3a and 5a. Thus, the screw 1 can be taken out. Normally, the lower mold members 3 and 5 are retracted from the respective upper mold members 2 and 4 to release the upper molding block and the lower molding block from each other.

At the time when the slide cores 2a, 4a, 3a and 5a are to be moved in the above-described manner, the screw 1 is in the state of adhering to or being gripped by the upper mold members 2 and 4 and the lower mold members 3 and 5. Accordingly, it is possible to easily move the slide cores 2a, 4a, 3a and 5a.

In the above-described manner, the cavities "h", "i", "j","k", "m" and "n" are formed as shown in FIG. 8 in the portions from which the respective slide cores 2a, 4a, 3a and 5a have been moved away. By utilizing these cavities, the upper mold members 2, 4 and the lower mold members 3, 5 can be made to move, whereby the screw 1 can be taken out of the mold assembly.

Although not shown, after the mold assembly has been opened by retracting the lower mold members 3 and 5 with the upper mold members 2 and 4 placed at their predetermined positions, the screw 1 supported by the upper mold members 2 and 4 can be taken out by a knockout pin (not shown).

Although the construction of the mold assembly and the mold opening method for the mold assembly have been described above, the construction of the mold assembly for molding the screw and the method of molding the screw have the following features.

1. A first feature of the method of molding a synthetic resin screw according to the present invention is that the synthetic resin screw is molded by using a mold assembly having parting planes at locations respectively corresponding to a crest and a root of a screw thread.

2. A second feature of the present invention is as follows. Slide cores are respectively combined with upper and lower mold members and a cavity is formed in an area in which the mold members and the slide cores are assembled. Each of the upper and lower mold members is paired with the corresponding one of the slide cores to form part of the cavity, and these mold members and the slide cores are arranged to be movable in different directions so that after spaces have been formed by moving the respective slide cores in directions in which non-undercuts are present, the spaces can be used to move the respective mold members in directions in which non-undercuts are present. By utilizing this feature, it is possible to easily withdraw a molded screw from the mold assembly.

To form non-undercut portions, the upper and lower mold members are prepared as separate members which are parted by planes containing the horizontal axes $H_1$, $H_2$ and the vertical axes $V_1$, $V_2$, respectively. The horizontal axes $H_1$, $H_2$ and the vertical axes $V_1$, $V_2$ are located to meet in the form of a cross on a center axis passing through the screw 1. If the upper mold members and the lower mold members are respectively integrally formed, a parting plane is formed between the upper molding block and the lower molding block, and, regarding each of the slide cores, a parting plane is formed in a direction perpendicular to the aforesaid parting plane.

Further, the parting lines L ("e", "f" and "g") are respectively formed to be positioned on the crests of the adjacent threads of the screw thread Y and on the root T.

The upper mold members 2, 4 which constitute the upper molding block in the above-described manner, the lower mold members 3, 5 which constitute the lower molding block in the above-described manner, and the slide cores 2a, 4a and 3a, 5a which are respectively engaged with the mold members 2, 4 and 3, 5, are disposed at positions each of which differs from the adjacent one by 90° as shown in FIG. 3. Therefore, each of the mold elements which are disposed along the same side of one thread of the screw thread Y can be moved in a direction which differs by 90° from the direction of movement of the adjacent one.

Since the mold elements are movable in different directions in the above-described manner in units of an angular extent of 90°, it is possible to prevent an undercut portion from being formed on either side face of the screw thread.

Also, either of the upper and lower mold members and the corresponding slide core are disposed in pair in each single area between the two adjacent threads of the screw thread, and the directions of movement of the mold member and the corresponding slide core disposed in the same area are 90° apart from each other.

As described previously, the upper mold members 2, 4 and the lower mold members 3, 5 are respectively combined with the slide cores 2a, 4a and 3a, 5a. The slide cores 2a, 4a and 3a, 5a are movable in parallel with the parting plane formed between the upper mold members 2, 4 and the lower mold members 3, 5, and the slide cores 2a and 4a as well as the slide cores 3a and 5a are respectively movable in directions opposite to each other. Accordingly, it is possible to prevent an undercut portion from occurring at any location on the screw 1.

According to the present invention, it is possible to mold continuously and integrally a square thread capable of accurate feeding or a long screw having a thread shape similar to the square thread. Accordingly, unlike the prior art, it is completely unnecessary to combine a plurality of screw units to construct a long screw.

Since the long screw molded integrally in this manner has a large strength and no stepped portions occur on a screw thread or a root, it is possible to manufacture precision screws.

According to the present invention, since a thread for one pitch is molded by a cavity portion made up of at least eight segments (at least six mold elements) which are continuously disposed, if the shape of each cavity portion is modified, it is possible to easily mold a screw of partly varied pitch, a screw having different cross sections, a screw having no threads in a particular portion, or other new types of synthetic resin screws which could not have been manufactured by the prior art molding method.

Incidentally, the "cavity portion made up of at least eight segments" does not mean that eight mold elements are necessarily needed, and it is a matter of course that such a cavity portion can also be formed by an upper molding block and a lower molding block as well as four sets of slide cores, two sets for each of the upper and lower molding blocks.

The present invention is not limited to the above-described embodiment, and is applicable to any kind of art of manufacturing synthetic resin screws without departing from the scope of the technical concept of the present invention.

What is claimed is:

1. A method of molding a synthetic resin screw, wherein the synthetic resin screw is molded by using a mold assembly having non-axially extending parting planes at a crest and at a root of a screw thread comprising the steps of; providing the mold assembly having the non-axially extending parting planes at the crest and at the root of the screw thread to form a cavity for a screw by means of an upper molding block, a lower molding block, and separate slide cores engaged in and with the respective upper and lower molding blocks; charging a molten resin into the cavity; moving the slide cores after the molten resin has been solidified; and moving the upper molding block and the lower molding block by utilizing spaces from which the respective slide cores have been moved away, and taking out a molded screw.

2. A method of molding a synthetic resin screw according to claim 1, wherein the slide cores are respectively moved with respect to adjacent side faces of a screw thread of the molded screw in directions in which non-undercuts are present, whereas the upper molding block and the lower molding block are moved in different directions each of which intersects a respective one of said directions.

3. A method of molding a synthetic resin screw according to claim 1, wherein the slide cores are respectively moved with respect to adjacent side faces of a screw thread of the molded screw in directions in which non-undercuts are present, whereas the upper molding block and the lower molding block are respectively moved in directions each of which makes an angle of 90° with a respective one of said respective directions.

4. An apparatus for molding a synthetic resin screw, comprising: an upper molding block; a lower molding block; and separate slide cores respectively slidably supported in and by the upper molding block and the lower molding block and respectively withdrawable in directions parallel to a parting plane between said upper molding block and said lower molding block block; said upper molding block, and said lower molding block, together with said separate slide cores forming a cavity surface for molding said synthetic resin screw.

5. An apparatus for molding a synthetic resin screw according to claim 4, wherein each of the slide cores has a contact face along a center axis of a screw to be molded.

6. An apparatus for molding a synthetic resin screw according to claim 4, wherein a cavity for molding a screw is divided into four areas about a center axis of the screw to be molded and a cavity portion for a thread for one pitch is formed of at least eight cavity segments, the direction of movement of each of the slide cores being 90° apart from the direction of movement of a corresponding one of the upper molding block and the lower molding block which support the respective slide cores.

7. An apparatus for molding a synthetic resin screw according to claim 4, wherein the upper molding block and the lower molding block are each formed by two separate mold members which are respectively-provided with the slide cores, each of the slide cores being movable in a direction which intersects the direction of movement of a respective one of the mold members.

8. An apparatus for molding a synthetic resin screw according to claim 4, wherein said upper mold block includes two upper mold members; said lower mold block includes two mold lower members to be joined to the upper molding block; four slide cores each respectively supported by one of the upper and lower mold members and respectively movable in directions parallel to a parting plane formed between the upper mold members and the lower mold members.

9. An apparatus for molding a synthetic resin screw according to claim 8, wherein the upper molding block includes the two upper mold members and two slide cores, while the lower molding block includes the two lower mold members and two slide cores, the lower molding block being supported for movement toward or away from the upper molding block.

10. An apparatus for molding a synthetic resin screw according to claim 8, wherein a mold portion for molding a thread for one pitch is formed by the two upper mold members, the two lower mold members, and four slide cores, and a cavity portion in the mold portion is formed by at least eight cavity segments where the two upper mold members, the two lower mold members and the four slide cores are assembled.

11. An apparatus for molding a synthetic resin screw according to claim 8, wherein the four slide cores are individually formed into planar shapes and are respectively integrally fixed to supporting blocks.

12. An apparatus for molding a synthetic resin screw according to claim 8, wherein either of the upper mold member and the lower mold member and a corresponding one of the slide cores respectively supported thereby are disposed in pair between adjacent threads.

* * * * *